(12) United States Patent
Shah et al.

(10) Patent No.: US 9,589,021 B2
(45) Date of Patent: Mar. 7, 2017

(54) SYSTEM DECONSTRUCTION FOR COMPONENT SUBSTITUTION

(75) Inventors: Amip J Shah, Santa Clara, CA (US); Manish Marwah, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 96 days.

(21) Appl. No.: 13/007,252

(22) Filed: Jan. 14, 2011

(65) Prior Publication Data
US 2012/0185508 A1    Jul. 19, 2012

(51) Int. Cl.
*G06F 7/00* (2006.01)
*G06F 17/30* (2006.01)
*G06F 13/14* (2006.01)

(52) U.S. Cl.
CPC .. *G06F 17/30495* (2013.01); *G06F 17/30958* (2013.01)

(58) Field of Classification Search
CPC ................ H04L 45/48; H04L 67/1095; G06F 17/30598; G06F 17/3071; G06F 17/30327; G06F 17/30961; G06F 17/30625; G06F 17/30705; G06F 17/2247; G06F 17/227; G06F 17/30091; G06F 17/30539; G06F 17/30958
USPC ....... 707/709, 797, 737, 772, 784, 692, 648, 707/705, 602, 780, 999.1, E17.046, 707/E17.012, E17.087, E17.089, E17.05, 707/E17.044, 999.101, 999.102, 802, 707/803, E17.005, E17.011, 723, 748, 707/749, 966, 999.107; 370/252, 400; 715/762, 272, 243, 234, 713, 700, 213; 714/37; 705/7.25, 7.36; 717/127, 131; 709/223
See application file for complete search history.

(56) References Cited

U.S. PATENT DOCUMENTS 5,852,560 A    12/1998  Takeyama et al.
6,049,797 A    4/2000   Guha et al.
(Continued)

FOREIGN PATENT DOCUMENTS

| WO | WO0041114 | 7/2000 |
|---|---|---|
| WO | WO0126044 | 4/2001 |

OTHER PUBLICATIONS

Bouley, Dennis, "Estimating a Data Center's Electrical Carbon Footprint," research paper.
(Continued)

*Primary Examiner* — Usmaan Saeed
*Assistant Examiner* — Cecile Vo
(74) *Attorney, Agent, or Firm* — Trenner Law Firm, LLC

(57) ABSTRACT

A method is provided for system deconstruction for component substitution. The method includes a system tree which is deconstructed in a computer-readable medium, the system tree deconstructing into constituent nodes. Each node in the system tree represents a characteristic of a component of a system under consideration. A database of trees is searched for trees containing similar attributes to the system tree. Trees are qualified based on a frequency of nodes that are similar to certain highly ranked nodes in the system tree. The most relevant nodes from the qualified trees are selected. Searching the database is terminated when the most relevant nodes account for a fraction, less than a whole, of an environmental footprint of the system tree.

20 Claims, 8 Drawing Sheets

(56) References Cited

U.S. PATENT DOCUMENTS

| | | | |
|---|---|---|---|
| 6,415,283 B1 | 7/2002 | Conklin | |
| 6,490,569 B1 | 12/2002 | Grune et al. | |
| 6,532,464 B1 | 3/2003 | Miyamoto | |
| 6,564,197 B2 | 5/2003 | Sahami et al. | |
| 6,691,044 B2 | 2/2004 | Kobayashi et al. | |
| 6,721,941 B1* | 4/2004 | Morshed | G06F 11/3612 709/217 |
| 6,742,001 B2 | 5/2004 | Ripley | |
| 6,757,242 B1 | 6/2004 | Wang et al. | |
| 6,862,540 B1 | 3/2005 | Welch | |
| 7,007,069 B2 | 2/2006 | Newman et al. | |
| 7,058,644 B2 | 6/2006 | Patchet et al. | |
| 7,151,752 B2 | 12/2006 | Frouin et al. | |
| 7,197,504 B1 | 3/2007 | Runkler et al. | |
| 7,272,607 B2 | 9/2007 | Udeshi et al. | |
| 7,287,026 B2 | 10/2007 | Oommen | |
| 7,310,624 B1 | 12/2007 | Aggarwal et al. | |
| 7,366,110 B2 | 4/2008 | Gillespie et al. | |
| 7,415,418 B2 | 8/2008 | Zimmerman | |
| 7,536,476 B1 | 5/2009 | Alleyne | |
| 7,620,632 B2 | 11/2009 | Andrews | |
| 7,634,464 B2 | 12/2009 | Chen et al. | |
| 7,668,100 B2 | 2/2010 | Balasaygun et al. | |
| 7,707,085 B2 | 4/2010 | Sakurai et al. | |
| 7,725,499 B1* | 5/2010 | von Lepel | G06Q 30/02 707/791 |
| 7,801,878 B2 | 9/2010 | Hayes et al. | |
| 7,831,416 B2* | 11/2010 | Grichnik | G06F 17/5009 703/1 |
| 7,958,257 B2 | 6/2011 | Gershinsky et al. | |
| 8,145,732 B2 | 3/2012 | Kumar et al. | |
| 8,352,465 B1 | 1/2013 | Jing et al. | |
| 8,862,721 B2* | 10/2014 | Wissner-Gross | G06F 17/30 709/223 |
| 2002/0032684 A1 | 3/2002 | Kobayashi et al. | |
| 2002/0099587 A1 | 7/2002 | Kakihana et al. | |
| 2002/0116161 A1 | 8/2002 | Freeman et al. | |
| 2004/0172442 A1 | 9/2004 | Ripley | |
| 2004/0181526 A1 | 9/2004 | Burdick et al. | |
| 2005/0021490 A1 | 1/2005 | Chen et al. | |
| 2005/0027681 A1 | 2/2005 | Bernstein et al. | |
| 2005/0086208 A1 | 4/2005 | Bestgen et al. | |
| 2007/0260595 A1 | 11/2007 | Beatty et al. | |
| 2007/0294291 A1 | 12/2007 | Sasaki et al. | |
| 2008/0154926 A1 | 6/2008 | Newman | |
| 2008/0250357 A1 | 10/2008 | Lee et al. | |
| 2009/0083390 A1 | 3/2009 | Abu-Ghazaleh | |
| 2009/0125529 A1 | 5/2009 | Vydiswaran et al. | |
| 2009/0248624 A1 | 10/2009 | Lammel et al. | |
| 2009/0313041 A1 | 12/2009 | Eder | |
| 2010/0076687 A1 | 3/2010 | DeYoung et al. | |
| 2010/0094885 A1 | 4/2010 | Andrews | |
| 2010/0100403 A1 | 4/2010 | Pollock et al. | |
| 2010/0145629 A1 | 6/2010 | Botich | |
| 2010/0165886 A1 | 7/2010 | Borrill | |
| 2010/0179794 A1 | 7/2010 | Shah et al. | |
| 2010/0223211 A1 | 9/2010 | Johnson et al. | |
| 2010/0235300 A1 | 9/2010 | Feingold | |
| 2010/0332444 A1* | 12/2010 | Akatsu | G06N 5/025 706/54 |
| 2010/0332475 A1 | 12/2010 | Birdwell et al. | |
| 2011/0161311 A1 | 6/2011 | Mishne et al. | |
| 2011/0173197 A1 | 7/2011 | Mehta et al. | |
| 2011/0307468 A1 | 12/2011 | Duan et al. | |
| 2012/0106367 A1* | 5/2012 | Barkol | G06F 17/30961 370/252 |
| 2012/0185422 A1 | 7/2012 | Shah et al. | |
| 2012/0185477 A1 | 7/2012 | Shah et al. | |
| 2012/0185489 A1 | 7/2012 | Shah et al. | |
| 2012/0185508 A1 | 7/2012 | Shah et al. | |

OTHER PUBLICATIONS

Ross, et al. "Collaborative Filtering and Carbon Footprint Calculation," Department of Informatics, May 17-19, 2010, pp. 1-6, University of California.

Cai, et al., "A Singular Value Thresholding Algorithm for Matrix Completion."

Romanowski, "A Data Mining Approach to Forming Generic Bills of Materials in Support of Variant Design Activities."

Torsello, "Four Metrics for Efficiently Comparing Attributed Trees," Aug. 23-26, 2004, vol. 2, pp. 467-470.

Romanowski, "On Comparing Bills of Materials: a Similarity/distance Measure for Unordered Trees."

"Eco-indicator 95" available at http://www.pre.nl/eco-indicator95/eco-indicator95.htm#Background.

Cheng, et al., "A Web Service Framework for Environmental and Carbon Footprint Monitoring in Construction Supply Chains," available at http://eil.stanford.edu/publications/jack_cheng/jack_greenSCOR_web_final.pdf.

Koutitas, "Low Carbon Network Planning," Apr. 12-15, 2010; pp. 411-417.

Gautam, et al. "Context-based Similarity Measures for Categorical Databases," Publication Date: 2000; pp. 201-210.

Tae-Wan Ryu and Eick, "Similarity Measures for Multi-valued Attributes for Database Clustering," available at http://citeseerx.ist.psu.edu/viewdoc/download?doi=10.1.1.54    3544&rep=rep1&type=pdf.

Cai and Yau, "Categorical Clustering by Converting Associated Information," Publication Date: 2006; pp. 31-36.

Haung, X., et al., "Clustering Graphs for Vizualization Via Node Similarities", Journal of Visual Languages and Computing, 17, 2006, 225-253.

Jeong Min Moon, et al., "Life Cycle Assessment Through On-Line Database Linked with Various Enterprise Database Systems." The International Journal of Life Cycle Assessment, vol. 12, No. 7, 488-496, DOI: 10, 1065/lca2006.10.276, Publication Date: 2003; vol. 8; on pp. 226-234.

Sustainable Minds Release 1.0 Offers Product Life Cycle Assessment for Autodesk Inventor Users Import of Bill of Materials Data Providers Seamless Interoperability, http://www.pitchengine.com/pitch/30787, Oct. 27, 2009.

Laurin, L.; et al., "Automated LCA—A Practical Solution for Electronics Manufacturers," http://www.ieeexplore.ieee.org/xpl/mostRecentIssue.jsp?punumber=10977. May 8-11, 2006.

Sundaravaradan, N., et al., "Discovering Life Cycle Assessment Trees from Impact Factor Databases", Proceedings of the Twenty-Fifth AAAI Conference on Artificial Intelligence, pp. 1415-1420, Aug. 7-11, 2011.

Romanowski, C., et al., "Data Mining in an Engineering Design Environment: or Applications from Graph Matching", Computers & Operations Research, 33, 2006, pp. 3150-3160.

Sundaravaradan, N., et. al., "Data Mining Approaches for Life Cycle Assessment", IEEE ISSST, May 16-18, 2011.

Delisle, R., et al., Induction of Decision Trees via Evolutionary Programming, J. Chem., Inf. Comput. Sci. 2004, 44. pp. 862-870.

* cited by examiner

SYSTEM DECONSTRUCTION FOR COMPONENT SUBSTITUTION

CROSS-REFERENCE TO RELATED APPLICATIONS

This patent application is related to U.S. patent application Ser. Nos. 13/007,175, 13/007,270, 13/007,073, 13/007,229, 13/007,270, 13/007,125, 13/007,152, each filed Jan. 14, 2011 and U.S. patent application Ser. No. 13/282,388 filed Oct. 26, 2011, and each incorporated by reference for the disclosed subject matter as though fully set forth herein.

BACKGROUND

Manufacturers in various industries use proprietary databases to track the price of individual components used during manufacturing, to determine how the change in price of various components impacts the overall price for their products. For example, a packaging manufacturer may maintain a database including price to obtain the stock materials (e.g., cardboard, plastic, and ink), produce the packaging (e.g., including cutting the cardboard, extruding the plastic, and printing the labels), and delivering the packaging to their customers. When the price of a component changes (e.g., fuel prices rise, thereby raising the price to obtain the stock materials and delivery), the manufacturer is able to use their database to quickly determine the overall impact the component change in price has on the overall price of their product so that the manufacturer can raise the price of their product (or make other adjustments) in a timely manner to reduce or eliminate any impact on their profit.

Manufacturers can also consider the impact of their products on the environment and other parameters. Electronics devices (e.g., computers, printers, and mobile phones), are a concern because these devices typically have very short lifetimes and are commonly discarded by consumers when newer devices become available. For example, users may discard their mobile phone every two years when they are offered free or discounted equipment to renew their mobile phone contract with their carrier. Consumers also may discard their computers, televisions, and other appliances after only a few years of service, often because it is less expensive to replace than to repair.

Life Cycle Analysis (LCA) databases are beginning to become publicly available. For example, the Open LCA initiative is a public domain data sharing protocol. These databases may include, for example, data related to the mining efforts of raw materials, in addition to the disposal/recycling efforts to handle the components of products after consumers discard the products. These databases have thus far experienced limited adoption.

The databases include vast amounts of data that can be useful to manufacturers given the component breakdown of current products. It is said, for example, that a product as simple as a pen can include over 1500 parameters when considered on a cradle-to-grave basis.

These databases are usually an accumulation of data, offering no analysis for the manufacturer. For example, while a user may be able to use these databases to check whether the use of a particular plastic might have a bigger impact than another type of plastic, the database still provides no other information that the manufacturer can use to make, e.g., business decisions.

DETAILED DESCRIPTION

Figure 1A:
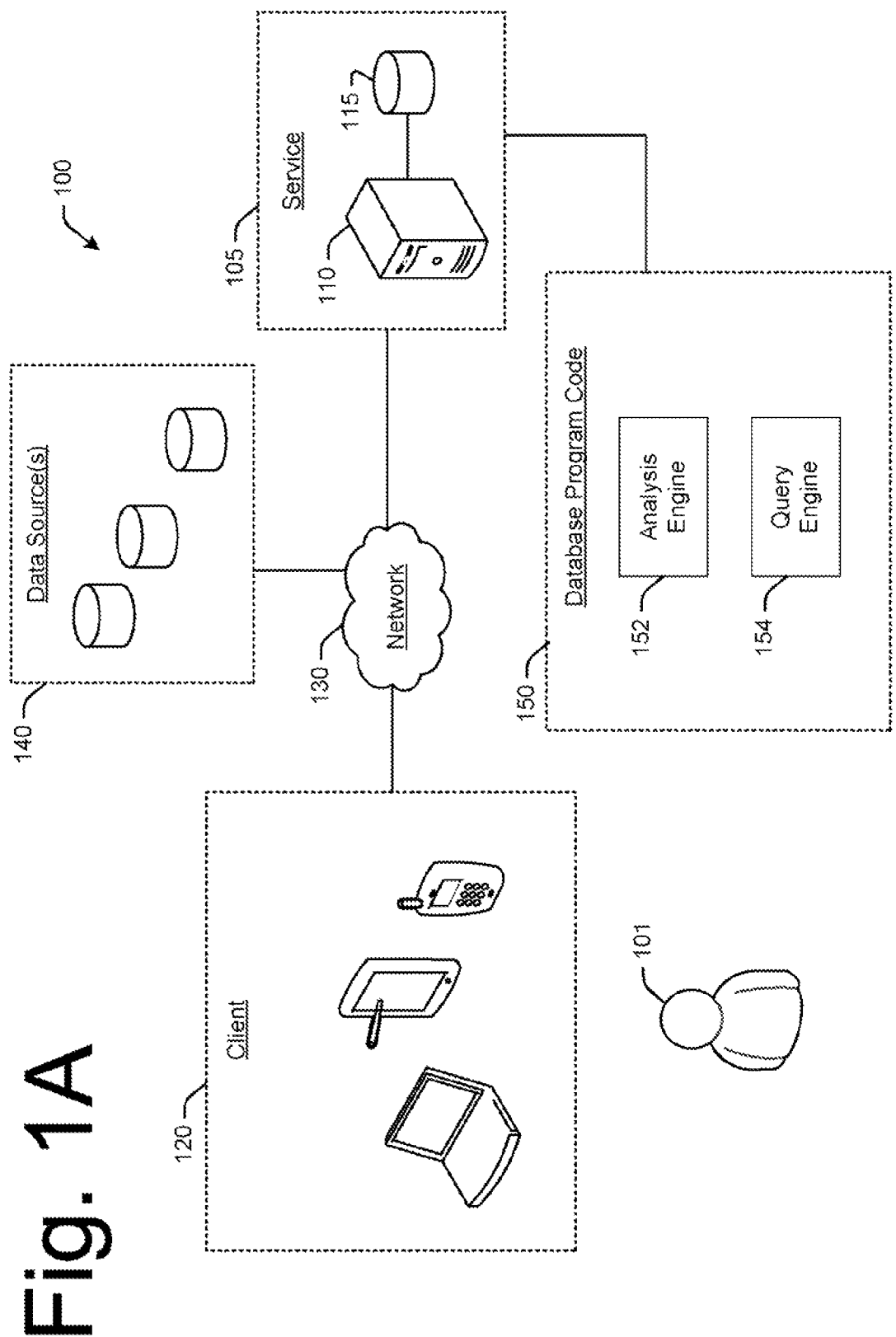
FIG. 1A is a high-level block-diagram of an example computer system that may implement system deconstruction for component substitution.

A user may use conventional databases to determine whether a component in a product might have a higher price or a bigger impact than another component. But design decisions can be more complex than this. For example, designers, manufacturers, and others may take into consideration a wide variety of characteristics of many different components of the overall device or service (referred to broadly herein as a "system"). Other factors that may also be considered include the intended use of the product, availability of components, customer demand, regulations and laws, to name only a few examples.

As used herein, the term "includes" means includes but not limited to, the term "including" means including but not limited to. The term "based on" means based at least in part on.

In manufacturing, for example, simply substituting a plastic component for a metal component in a product because it has a lower environmental impact may not be possible based on one or more other consideration. For example, a certain type of plastic may indeed have a lower environmental impact, but lacks durability (affecting customer satisfaction and/or warranty). Therefore, the plastic may not be a suitable substitution for the metal component. In another example, the plastic may be more expensive than the metal, or fail on some other parameter. Decisions to substitute components cannot be made by simply consulting a database, without some analysis of many different information paths.

Briefly, component substitution systems and methods are disclosed herein which enable automated large-scale data analysis for informed decision-making. It is noted that although the systems and methods are described herein with reference to the design and manufacture of an electronic device, the systems and methods can broadly be applied to the design and implementation (manufacture, management, etc.) of any of a wide range of different types of devices, facilities, and/or services (generally referred to herein as the "system under consideration").

An example of a system includes a computer readable storage to store at least one system tree having a plurality of nodes. The system tree may be stored in a data structure (e.g., a database). Each node in the system tree represents a characteristic of a component. For example, a system tree for a new computer may include a keyboard node, a motherboard node, a hard disk drive node, and a display node. Each node may also include child nodes. For example, the motherboard node may also include child nodes for motherboard components, such as the onboard memory, and processor. The database may include information about price of the product, environmental impact, performance, product warranty, customer satisfaction, among others, for each of the nodes in the tree. The information may be referred to generally as "cost." That is, the term "cost" may include price, carbon footprint, energy consumption (e.g., kilowatt hours), number of warranty calls and/or price associated with those warranty calls, and any other suitable metric for characterizing different components.

Assessing system is often an expensive and arduous process. For example, it can take up to six months or longer to perform a full environmental "footprinting" of a given system. Several methods to improve the analysis are known. For example Economic Input-Output (EIO) LCA is a technique that utilizes economic data for estimating the average footprint of a given device. Other implementations further extend existing EIO-LCA approaches to rapidly obtain environmental footprints using readily available economic data. However, EIO-based methodologies still use economic data about the system which, while easy to obtain for the manufacturer's own systems, are often difficult to obtain for competitive or supplier systems. Thus, the accuracy of EIO-based approaches often decreases as the scope of the system is increased.

Once the assessment is completed, the designer today must manually search through the assessment output in order to identify opportunities to reduce the environmental footprint. The systems and methods disclosed herein streamline this re-design or Design for Environment (DfE) process by automatically identifying candidate designs with reduced environmental footprint as a starting point.

In an example, an analysis engine is operatively associated with the computer readable storage to compare nodes of the system tree with nodes in other trees. For example, the analysis engine may compare nodes of the system tree for the new computer with other trees for other computers. The analysis engine may determine that the other trees for a laptop computer, desktop computer, and netbook computer, all have the same motherboard node (i.e., the same root nodes).

A new tree may be created by substituting or replacing at least one node in the system tree with at least one of the nodes from the other trees. For example, if the manufacturer is seeking to produce a "green" or "designed for the environment" computer, the processor node in the system tree may be replaced with the processor node from one of the more energy efficient laptop or netbook computers.

In an example, the nodes may be rated. A higher rating may indicate a better candidate for substitution. For example, the motherboard node for the netbook computer may receive a higher rating for price than the desktop computer, because the price of the motherboard in the netbook computer is lower than the price of the motherboard in the desktop computer. But the motherboard node of the laptop computer may receive a higher rating than the desktop computer for environmental impact, because the processor in the laptop computer is more energy efficient than the processor in the desktop computer. Of course, the processor in one type of laptop computer may be made of more environmentally friendly components than the processor in another laptop computer, and so forth.

In another example, the rating may be weighted to enable multidimensional analysis. For example, if the user values a lower environmental impact above price, then the rating for environmental impact is assigned a higher weight than price. Other parameters that may also be considered include, but are not limited to, customer satisfaction, warranty, customer desires, regulations/laws, company policy, and manufacturing goals, to name only a few examples.

The systems and methods described herein provide for component substitution based on a knowledge base of information for existing components. The systems and methods described herein can be used to meet or exceed customer expectations, marketing goals, environmental impact, and/or other considerations without the need to develop new components.

FIG. 1A is a high-level block-diagram of an example computer system 100 which may implement system deconstruction for component substitution. System 100 may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a host 110 providing a service 105 accessed by a user 101 via a client device 120. For purposes of illustration, the service 105 may be a data processing service executing on a host 110 configured as a server computer with computer-readable storage 112. The client 120 may be any suitable computer or computing device (e.g., a mobile device) capable of accessing the host 110. Host 110 and client 120 are not limited to any particular type of devices. It is also possible for the host 110 and client 120 to be the same device (e.g., a kiosk platform). Although, it is noted that the database operations described herein which may be executed by the host 110 are typically better performed on a separate computer system having more processing capability, such as a server computer or plurality of server computers. The user interface may be provided on any computing device for providing data to, and receiving data from, service 105.

The system 100 may also include a communication network 130, such as a local area network (LAN) and/or wide area network (WAN). In one example, the network 130 includes the Internet or other mobile communications network (e.g., a 3G or 4G mobile device network). Network 130 provides greater accessibility to the service 105 for use in distributed environments, for example, where more than one user may have input and/or receive output from the service 105.

In an example, the host 110 is implemented with (or as part of) the service 105 in the networked computer system 100. For example, the service 105 may be a cloud-based service, wherein the host 110 is at least one server computer in a cloud computing system. The host 110 may be provided on the network 130 via a communication connection, such as via an Internet service provider (ISP). In this regard, the client 120 is able to access host 110 directly via the network 130, or via an agent, such as a network site. In an example, the agent may include a web portal on a third-party venue (e.g., a commercial Internet site), which facilitates a connection for one or more clients 120 with host 110. In another example, portal icons may be provided (e.g., on third-party venues, pre-installed on a computer or mobile device, etc.) to facilitate a communications connection between the host 110 and client 120.

Before continuing, it is noted that the host 110 is not limited in function. The host 110 may also provide other services to other computing or data processing systems or devices in the system 100. For example, host 110 may also provide transaction processing services, email services, etc.

In addition, the host 110 may be operable to communicate with at least one information source 140. The source 140 may be part of the service 105, and/or the source 140 may be distributed in the network 130. The source 140 may include any suitable source(s) for information about various components. For example, the source 140 may include manufacturer specifications, proprietary databases, public databases, and/or a combination of these, to name only a few examples of suitable sources. The source 140 may include automatically generated and/or manual user input. If the source 140 includes user-generated data, an appropriate filter may be applied, e.g., to discard "bad" data or misinformation. There is no limit to the type or amount of information that may be provided by the source 140. In addition, the information may include unprocessed or "raw" data. Or the data may undergo at least some level of processing.

The host 110 may execute analytics using the information from the source 140 to generate output for use in component substitution for device manufacture. For example, the host 110 receives information from the source 140 including environmental impact based on a cradle-to-grave assessment for various components that may be used in the system. The host 110 may maintain the results in at least one data structure (e.g., a matrix or table or database) in computer-readable media 115. The data structure may be accessed by the host 110, which performs analytics based on input by the client 120, and outputs the results for the user at the client 110.

In an example, the host 110 performs the analytics described herein by executing database program code 150. The database program code 150 may include an analysis engine 152 and a query engine 154. In an example, the analytics engine 152 may be integrated into the query engine 154. The analytics engine 152 may be an SQL-based analytics engine, and the query engine 154 may be an SQL query engine. However, the operations described herein are not limited to any specific implementation with any particular type of database.

A system that implements component substitution for device manufacture as described herein has the capability to take a description of a system under consideration (including, in terms of inherent properties of the device), and assess the characteristics (e.g., price, environmental footprint, customer satisfaction, warranty) of the individual components. The system may then output a list of substitute components and/or an assessment of various product designs. Component substitution may be better understood with reference to the following discussion of an example implementation of machine readable instructions.

Figure 1B:
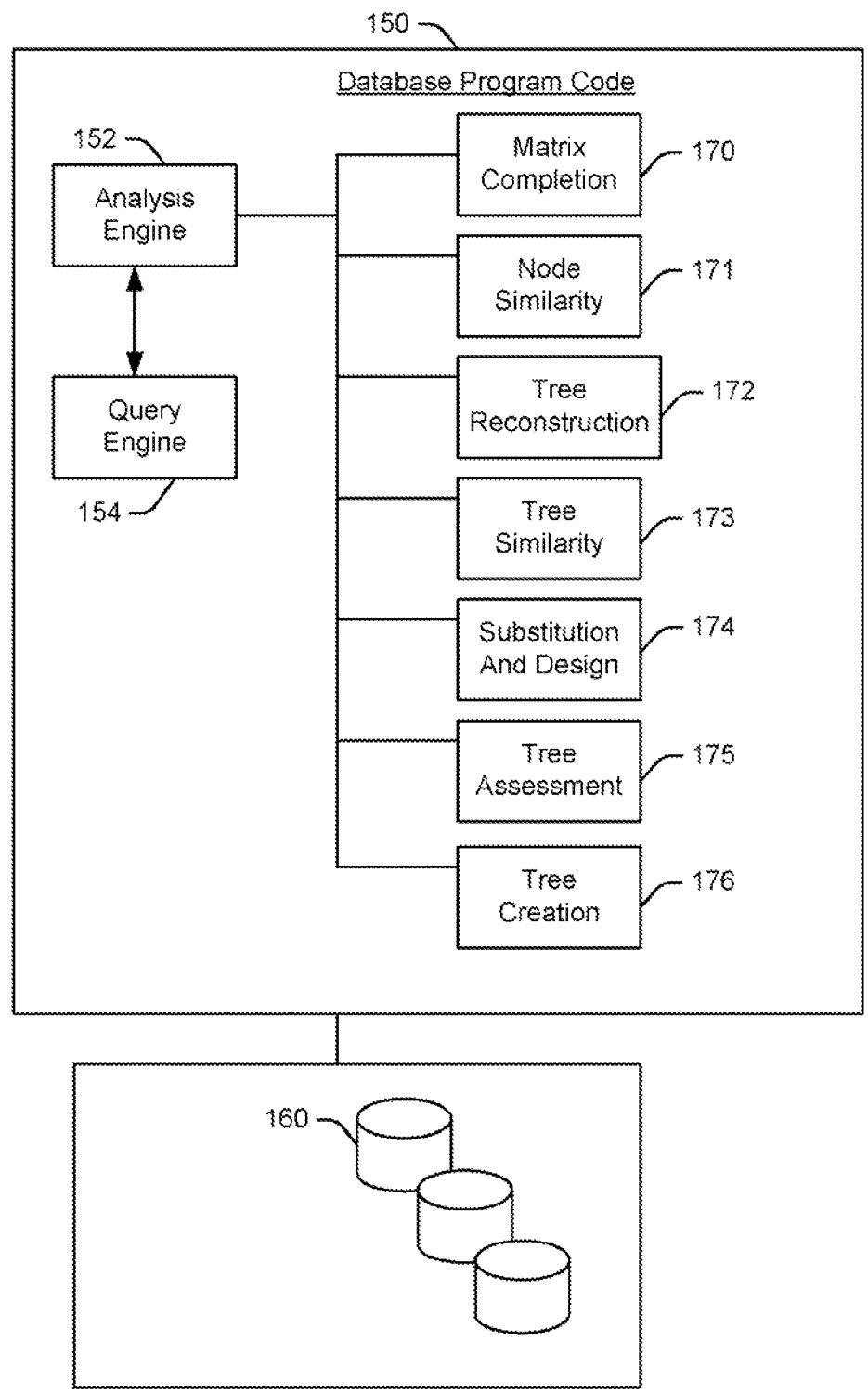
FIG. 1B shows an example architecture of machine readable instructions for database program code which may execute program code for system deconstruction for component substitution.

FIG. 1B shows an example architecture of machine readable instructions for the database program code 150 which may execute program code system deconstruction for component substitution. In an example, the database program code 150 may be implemented in machine-readable instructions (such as but not limited to, software or firmware) stored on a computer readable medium (e.g., storage 115 in FIG. 1A) and executable by one or more processor (e.g., on host 110 in FIG. 1A) to perform the operations described herein. The database program code 150 may perform operations on at least one database 160 (or other data structure). The database 160 may be provided on the same or different computer readable medium (e.g., storage 115 in FIG. 1A). It is noted, however, the components shown in FIGS. 1A and 1B are provided only for purposes of illustration of an example operating environment, and are not intended to limit execution to any particular system.

During operation, the analysis engine 152 may be operatively associated with the query engine 154 to execute the function of the architecture of machine readable instructions as self-contained modules. These modules can be integrated within a self-standing tool, or may be implemented as agents that run on top of an existing database. Existing data are used as seed data to populate a matrix. A comparison is then run between the device and the populated matrix using node comparison techniques (and related algorithms). After a set of similar nodes has been identified, trees are constructed to identify the structure resident within the similar nodes. The constructed tree is then compared to the system tree. When a similar tree (or set of trees) has been identified, the tree(s) are assessed for one or more parameter (e.g., environmental footprint). In an example, one or more node (e.g., portions of trees or even entire trees) may be substituted in the system tree. For example, the offending node(s) may be replaced with potentially better rated nodes, and also assessed to identify a better rated tree. The highly-rated tree(s) are used to mine the populated matrix for novel sub-trees from other devices, which may lead to a better rated solution.

In an example, the architecture of machine readable instructions may include a matrix completion module 170. The matrix completion module 170 may populate the database with information related to various devices. The information may include price and environmental impact, among other characteristics. Existing data from commercial databases, published literature, or internal systems may be used as seed data. The seed data is then expanded through one or more of data mining, knowledge discovery, regression, and/or other techniques. In this manner, only a few starting points of readily available data are used initially, and more comprehensive information can be constructed for the database.

The architecture of machine readable instructions may also include a node similarity module 171. The node similarity module 171 may be used to identify relevant characteristics of the device being assessed. These characteristics may be relevant to at least one of the parameters. For example, the published energy use rate for the device is directly related to environmental impact. But the characteristics may also include part name, part number, composition of the device, etc. The relevant characteristics of the device are then compared to the matrix of information in the database to identify any similar nodes. These nodes may be considered to be similar at the root (e.g., two different laptop computers), or similar in terms of other relational characteristics (e.g., a computer housing and a printer housing).

The architecture of machine readable instructions may also include a tree reconstruction module 172. After a group of related nodes have been identified, the tree reconstruction module 172 further outlines how the identified nodes are structurally related to one another. In an example, a root node is detected or inputted, and then the remaining nodes are identified as children or non-children of the root node. Based on the identified children nodes, a hierarchical structure may be generated which is used to construct a tree.

The architecture of machine readable instructions may also include a tree similarity module 173. After constructing a tree of relevant nodes from the populated matrix, this tree is then compared to the system tree. The system tree may be assessed, and a bill-of-materials developed for the device.

Examples of methods to identify metrics for comparing two trees, include but are not limited to, tree depth, breadth, and distance between relative nodes. The output may include a similarity rating relative to identified trees of relevance in the populated matrix.

The architecture of machine readable instructions may also include a tree substitution and design module 174. After two or more trees of relevance have been identified, opportunities to replace "offending" nodes in the system tree may be sought. For example, a laptop computer may be identified as being similar to another laptop computer stored in the database. Suppose the processors of each laptop computer are identified as the offender. Then, if the processor of another laptop computer tree has a lower environmental footprint than the processor in the system tree, the processor node in the other laptop tree may be substituted for the processor node in the system tree. The new system tree results in a laptop computer having a lower environmental footprint. Next, the tree substitution and design module moves on to the next highest offender (e.g., the hard disk drive node), and the process repeats. The output results in a new tree for the device having a lower environmental footprint.

The architecture of machine readable instructions may also include a tree assessment module 175. The tree assessment module 175 may be used to assess a device, rather than redesign the device. In an example, the total environmental footprint of the tree may be calculated based on the similarity metrics identified by the tree similarity module. Methods to rapidly calculate the footprint of very large trees based on a hierarchy of nodes with similar grouping may be utilized. The output of the tree assessment module may include an estimated environmental footprint of the system tree. Additional metrics of relevance may also be output. For example, additional metrics may include but are not limited to, the minimum calculated environmental footprint of substitutive trees, the most similar tree with a lower environmental footprint, and the average footprint of all relevant trees.

The architecture of machine readable instructions may also include a tree creation module 176. The tree creation module 176 utilizes output from the other modules (e.g., the tree reconstruction module 172 and the tree substitution module 174) to create new trees. The fundamental principle is that different systems may perform similar functions, but not necessarily be previously viewed in similar fashion. For example, a server computer may use a particular component hierarchy in the supply chain that is also relevant to a laptop computer. But the manufacturer may not have considered such a hierarchy for numerous reasons, not the least of which is the manufacturer's own belief that server computers are different than laptop computers.

It is noted that the functional modules are shown for purposes of illustration. Still other functional modules may also be provided. In addition, the functional modules may be combined with one another.

As noted above, the database 160 may store at least one tree with a plurality of nodes. Each node in the tree represents at least one characteristic of a device. For example, the database 160 may include a tree for a new computer. The new computer tree 250 may include nodes for the motherboard, the hard disk drive, the keyboard, and the display. The motherboard node may include information about cost, e.g., at least one of price, environmental impact, performance, product warranty, and customer satisfaction, among other characteristics of the motherboard.

Figure 2A:
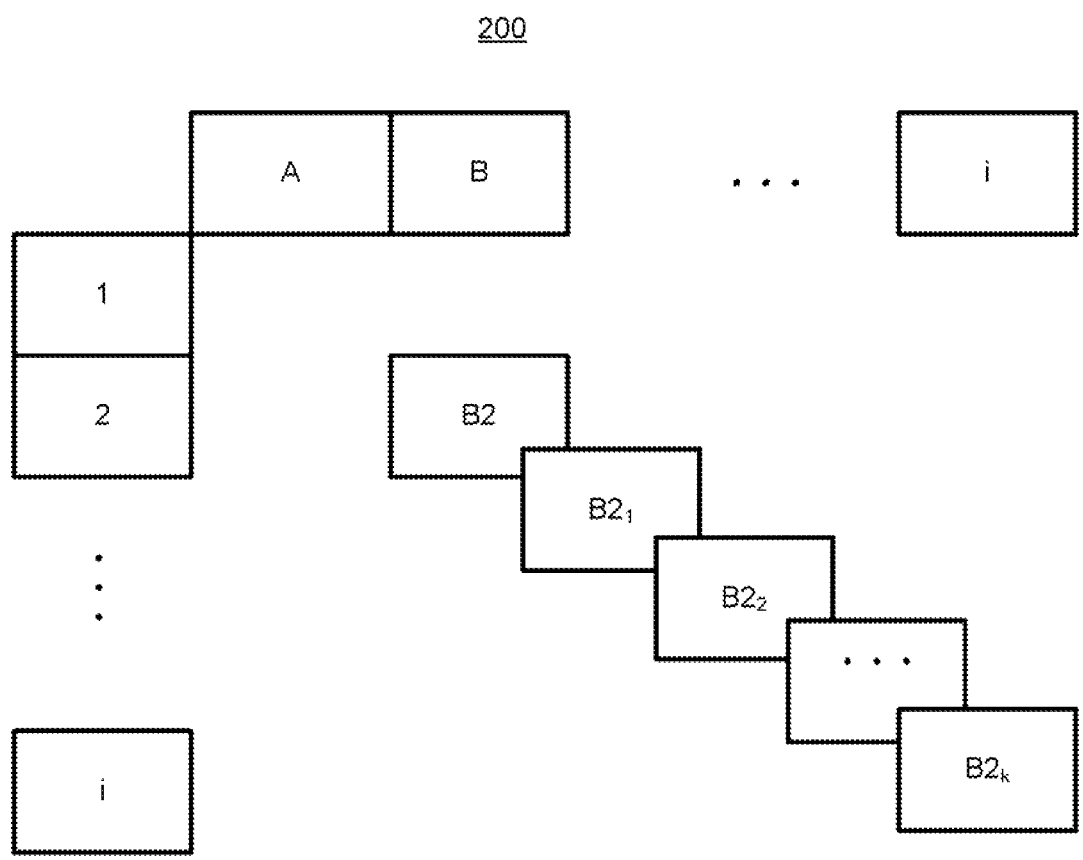
FIG. 2A illustrates an example multidimensional data structure.

In an example, the database 160 may be a multidimensional data structure. FIG. 2A illustrates an example multidimensional data structure. In this example, the database is configured as a matrix 200 with information for each node. Example information may include, but are not limited to the following characteristics: price, environmental impact, performance, product warranty, and customer satisfaction, to name only a few examples.

In FIG. 2A, the matrix 200 includes a plurality of columns (A, B, . . . i) and a plurality of rows (1, 2, . . . j). The intersection of each row and column may be referenced by the combination of row label and column label. For example, the intersection of column B and row 2 may be referred to as B2. In an example, each row corresponds to a component, and is thus used to generate the nodes in trees. The columns correspond to characteristics for the components. In an example where column B is for a computer display and row 2 is for environmental impact, the intersection B2 may include environmental impact information (e.g., overall carbon footprint) for the computer display.

The matrix 200 is not limited to the two-dimensional example given above. In another example, the program code may go to the intersection B2, and then read forward/backward in a third dimension to obtain more detailed environmental impact information included in the overall carbon footprint calculation, such as but not limited to, energy use, toxic emissions, and waste disposal. For purposes of illustration, the addresses in the third dimension may be referenced using any suitable symbols, such as subscripts, wherein the address is $B2_1, B2_2, \ldots B2_k$.

The information in the multidimensional data structure may be included in, or referenced by the nodes in the trees. For example, a printed circuit board node may reference intersection B2 in the matrix 200 for environmental impact information related to that particular printed circuit board. It is noted that multiple nodes in different trees may reference the same address in the same matrix 200. By way of illustration, the printed circuit board nodes in a plurality of different computer trees may each reference the intersection B2 in the same matrix 200, if intersection B2 includes information for environmental impact that is the same for each printed circuit board.

Figure 2B:
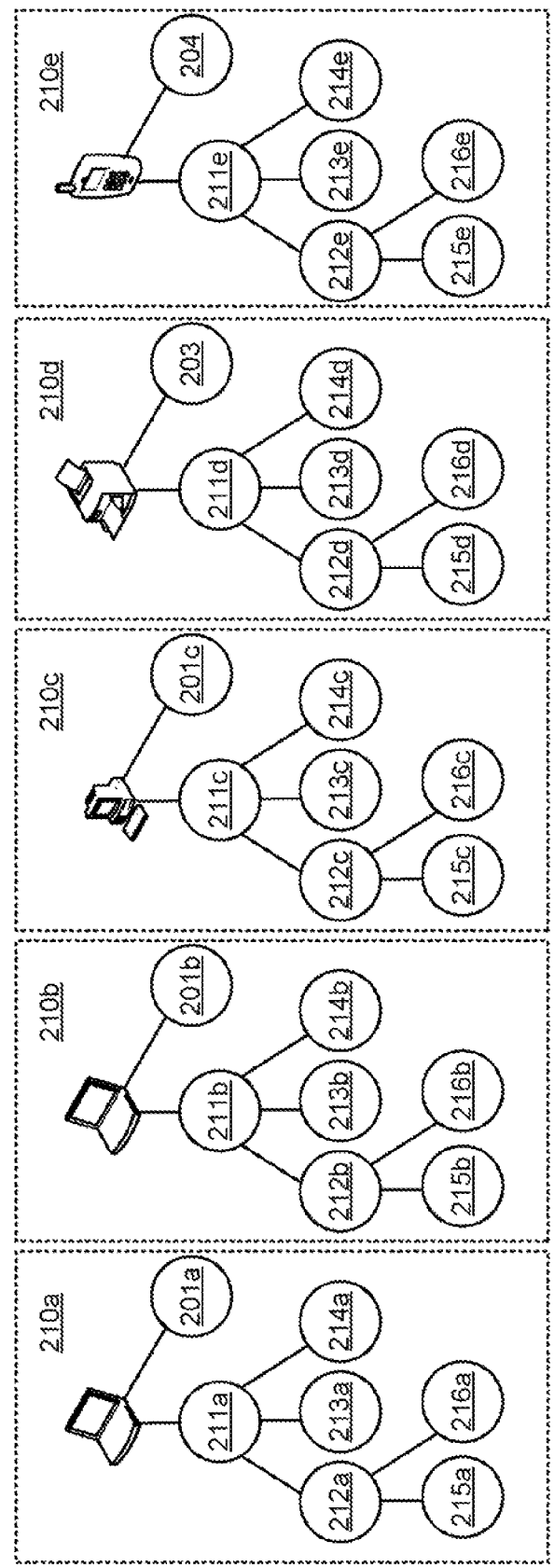
FIG. 2B illustrates a plurality of tree structures that may be provided in the data structure.
Figure 2C:
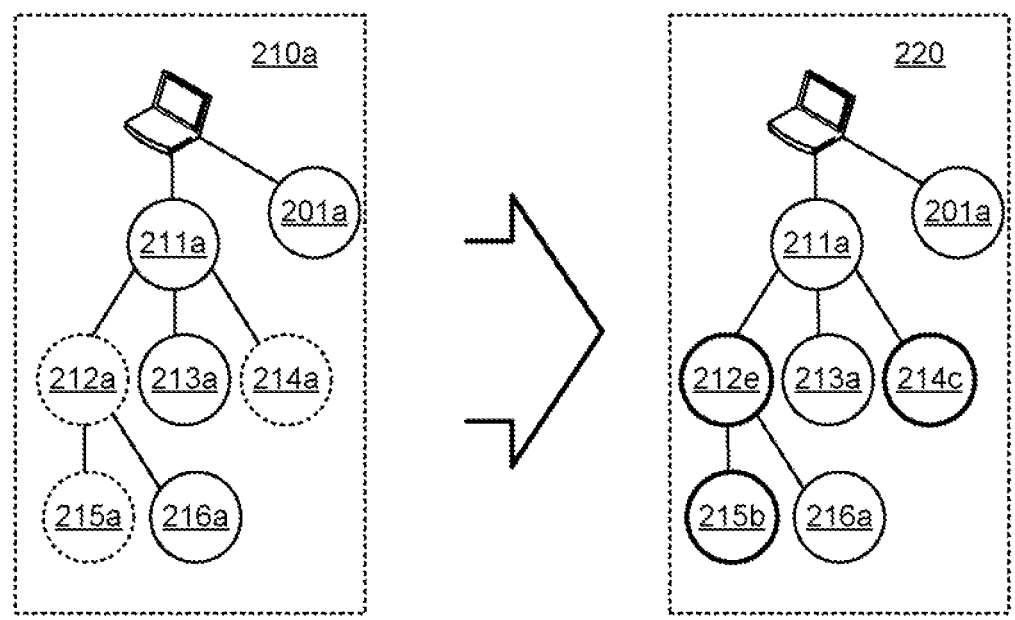
FIG. 2C shows an example of a new system tree.

The matrix 200 shown in FIG. 2A is shown and described herein as an example data structure that may be used to generate the tree structures shown in FIGS. 2B and 2C. It is noted, however, that the tree structures may be based on information provided in any suitable format(s).

The tree structure provided in the database may be better understood from the following discussion with reference to FIG. 2B. FIG. 2B illustrates a plurality of tree structures 210a-e that may be provided in the database. The trees 210a-e each have a plurality of nodes. Each node in the tree 210a-e may further include subnodes, thereby defining a child-parent relationship between the nodes, and providing additional layers of granularity for the components.

For purposes of illustration, the tree structures 210a-c are for computer devices. It is noted that any suitable number and type of other trees may be also used. For example, tree structure 210d is for a printer, and tree structure 210e is for a mobile phone. Accordingly, nodes that are suitable for substitution may be found in system trees that are not necessarily related to one another in a conventional sense. For example, a computer is different than a printer in most regards, which is different than a mobile phone. But there may be overlap in at least one of the nodes. For example, computers, printers, and mobile phones all have in common a processor, some degree of memory, and a housing.

In this example, all of the trees 210a-e (even the printer and mobile phone trees) include motherboard nodes 211a-e, in addition to nodes for other components. At least some of the other component nodes may be related in the different trees (e.g., nodes 201a-c are related). At least some of the other component nodes may not be related in the different trees (e.g., node 203 for ink cartridges in the printer tree 210d and node 204 for the antenna in the mobile phone tree 210e).

Continuing with this example, motherboard nodes 211a-c may include subnodes 212a-c for the circuit boards, subnodes 213a-c for the onboard memory, and subnodes 214a-c for the processors. These subnodes are each related to the respective motherboard nodes 211a-c as child nodes. Furthermore, the child nodes may also have child nodes of their own. For example, the circuit board nodes 212a-c may include child nodes 215a-c for the wafer and child nodes 216a-c for the metal traces.

During operation, program code (e.g., the database program code 150 in FIGS. 1A and 1B) is executed to create a system tree (e.g., system tree 210a in FIG. 2B) for a new system (e.g., a new laptop computer). The program code is also executed to identify and analyze other trees (e.g., system trees 210b-e). In an example, the program code traverses the trees and detects at least one root node in each of the trees. For example, the program code may compare nodes of the new system tree 210a with laptop/netbook computer trees 210b, desktop computer trees 210c, printer trees 210d, and mobile phone trees 210e. Each of the trees may include root nodes for motherboards (nodes 211a-e in FIG. 2B). Root nodes may also be identified for one or more subnode. Accordingly, the motherboard node 211a (and/or the subnodes) in the system tree 210a for the new system is compared to the motherboard nodes 211b-e in the other trees 210b-e.

The program may also be executed to rate the nodes. The nodes may be rated based on information in the database (e.g., in matrix 200 in FIG. 2A), to determine the suitability of a substitution. In an example, a higher rating may indicate a better candidate for substitution than a lower rating (although the opposite may also be true). For example, the motherboard node 211b of one of the laptop/netbook computer trees 210b may be assigned a higher rating for price than the motherboard node in the desktop computer trees 210c, because the price of the motherboard in the netbooks is lower than the price of the motherboard in the desktop computers. The motherboard node of the desktop computer trees 210c may be assigned a higher rating than the netbooks for performance. But the motherboard node 211b of the laptop/netbook computer trees 210b may receive higher ratings than the desktop computer trees 210c for environmental impact, because the processor in the laptop/netbook computers is more energy efficient.

The processor in one type of laptop computer may be more energy efficient than the processor in another laptop computer, and therefore the motherboard node for one of the laptop computer trees 210b may receive a higher rating than the motherboard node for the other laptop computers in the same group of trees 210b. The ratings may also be weighted. For example, environmental impact may receive a higher weighting if environmental impact is more pertinent to the user than price.

After a suitable substitution is determined, the program code may further be executed to create a new tree for the new system using node replacement or substitution based on nodes and/or subnodes in other trees. FIG. 2C shows an example of a new system tree 220. In this example, the new tree 220 is created from the tree 210a. But the new tree 220 is created with the node 215b from the laptop computer tree 210b because this node has the best rating for environmental impact. The new tree 220 is also created with the node 214c from the desktop computer trees, because this node has the best performance. The new tree 220 is also created with the node 212e from the mobile phone tree because this node has the lowest price.

It is readily appreciated from the above discussion that the systems and methods may be utilized to provide a quick assessment of a large amount of manufacturing information for a wide variety of different systems, and with high accuracy. The systems and methods may be used to modify device manufacture, e.g., by reducing the price to manufacture, reducing the impact the device has on the environment, and reducing warranty calls, all while increasing customer satisfaction with the product. These considerations are particularly relevant for so-called "fleet" customers or enterprise customers who purchase in large quantities, and therefore carefully consider the many different impacts of their purchases.

In this regard, the systems and methods may be implemented as a product assessment service. For example, the systems and methods may be used by enterprises who demand emissions reduction or compliance with environmental goals and/or regulations. Many of these enterprises are turning to their vendors to help assess, monitor, and reduce their environmental footprint. The systems and methods not only enable manufacturers to competitively reduce the environmental footprint of their customers, but to also competitively reduce the environmental footprint of their own supply chain.

These considerations are also relevant to consumers who are becoming more conscious of the impact their own purchases have on the environment.

In addition to environmental impact, the systems and methods also provide the foundation for significant savings, both direct (e.g., supply-side) and indirect (e.g., reducing warranty calls). The ability to automate product analysis may be a differentiator for some manufacturers in reducing price for smaller customers, and scaling to meet the demands of larger customers, while maintaining or even growing profit margins.

Figure 3:
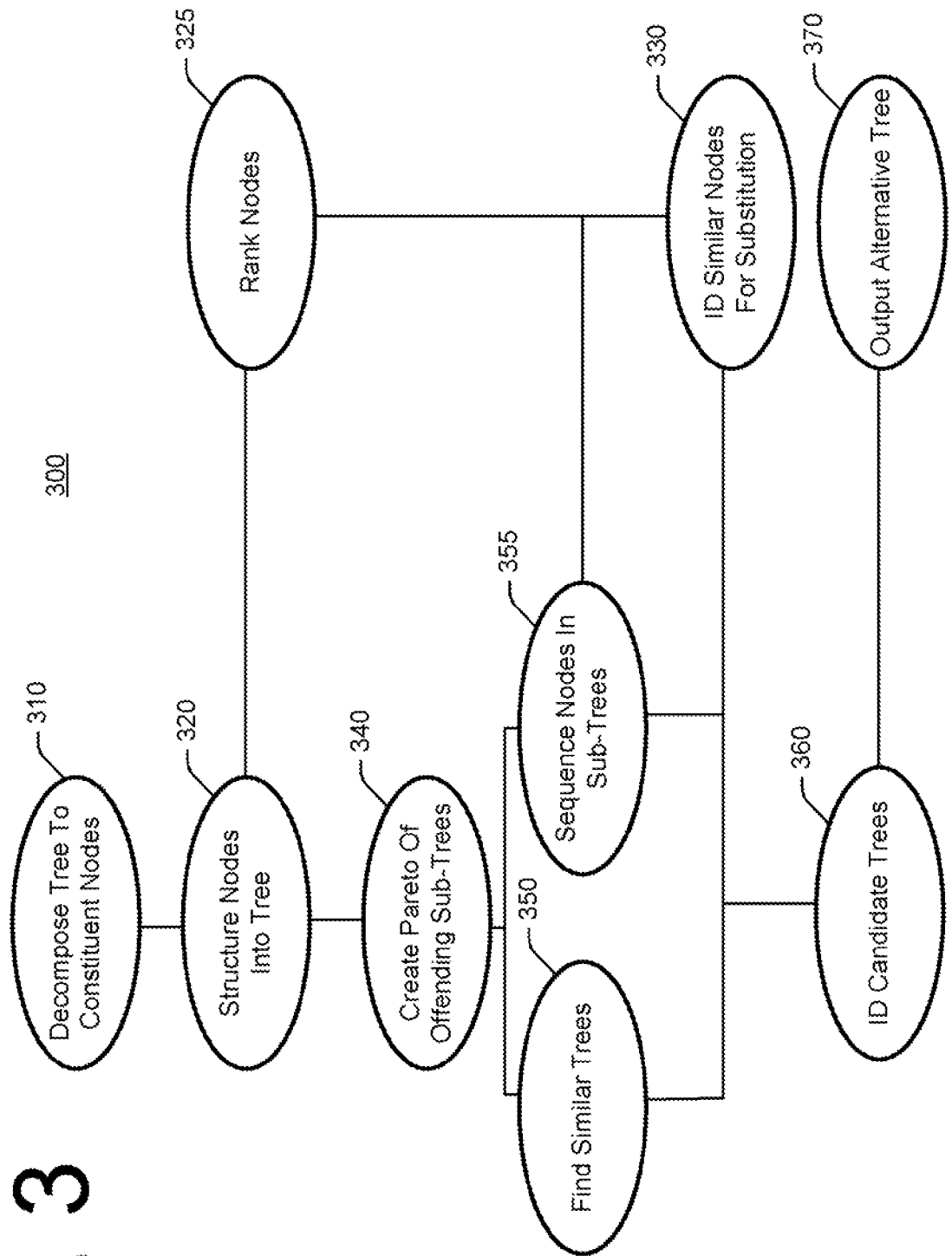
FIG. 3 is a process flow diagram illustrating example operations of system deconstruction for component substitution which may be implemented.

FIG. 3 is a process flow diagram 300 illustrating example operations of system deconstruction for component substitution which may be implemented. The inputs at block 310 are the disaggregation of an existing system into a set of constituent "nodes". For example, a laptop may be broken up into its constituent components such as, plastic housing, motherboard, hard disk drive, keyboard, electrical wiring, and so forth. Each component may be further disaggregated. For example, the motherboard may be broken up into further constituent components such as, computer board wafer, memory, processor, wiring traces, and so forth. There is no limit to the degree of disaggregation, although practical concerns may apply.

The constituent components may be represented by nodes. At block 320, the nodes may be structured into a tree. The tree structure may be based at least in part on the relationship of the nodes to one another (e.g., parent-child relationships). For example, the laptop tree may include a motherboard parent node including child nodes for the computer board wafer, memory, processor, wiring traces, and so forth.

Once the laptop tree has been constructed, the database is searched for trees with similar attributes around an inputted band of variability allowed across key system characteristics. As a result, trees with similar structures can be detected. In an example, the tree search may be implemented sequentially, wherein each tree in a given database is compared to other trees. In another example, expeditious database search methods may also be implemented.

The nodes may be ranked at block 325. In an example, nodes may be ranked according to degree or impact. For example, certain types of metal that are scarce in the environment or are obtained by environmentally "unfriendly" methods may rank higher as offending nodes (e.g., nodes that can be replaced to make a dramatic change in overall impact of the laptop computer device). For example, nodes that are identified at block 330 as being similar may be used to replace the offending nodes.

Additional techniques may be leveraged for component substitution. One example technique is node similarity, which compares a given node within the tree to other nodes existing within a given database. Another example technique is tree similarity, which compares a given tree to another tree within a given database. Comparing trees can be implemented more quickly than a node-by-node comparison, particularly for large trees consisting of several thousand nodes.

These techniques enable the system to computationally explore opportunities to enhance or reduce impact of at least one node (e.g., by reducing the environmental footprint of a device or other product). To accomplish this, domain-specific tacit knowledge is translated into measurable metrics of similarity that give rise to rules, which can be evaluated automatically.

To illustrate this approach, consider the example of a given laptop system. As described above, this system can be disaggregated into constituent elements or components, such as semiconductors, plastics, etc. Each of these constituent elements have assigned properties (characteristics), such as the size of the semiconductors, the mass of plastics, etc. These properties or characteristics are only metrics of similarity, and are not necessarily physical embodiments of the constituents. Further, these similarity metrics can be derived synthetically rather than manually. Similarly, the entire laptop "tree" can be construed as having a set of known properties, including the depth or breadth of the tree, branch structures, etc.

The detection may also yield a large number of similar trees. Accordingly, the results space may be narrowed by qualifying the identified trees in terms of the frequency of similar nodes, the structure or number of branches where similar nodes are identified, or other metrics of similarity. Multivariate attributes, typically available for each node, can also be used for computing a similarity metric. At block 340, a Pareto of offending sub-trees may also be generated. Pareto data structures represent discrete data. A Pareto may be implemented as any suitable data structure (e.g., a bar chart) that shows the order of the most frequently occurring offending nodes or sources of offending nodes. In operations 350 and 355, similar trees are identified, and then the nodes are sequenced in the sub-trees. Sequencing the nodes may include identifying the highest offending nodes (or those having the greatest overall impact).

The final similarity metric for both individual nodes and trees/sub-trees may then be the weighted sum of the similarity of each of the attributes. The similarity function for each attribute is defined by a domain expert. For example, similarity between string attributes may be computed from their longest common subsequence (LCS) match. In another example, similarity may be based on a longest common prefix (LOP), or a combination of LCS and LOP. In another example, similarity may be computed using Levenshtein distance between the strings. Other similar string matching algorithms may also be used. Similarity between numeric attributes may be computed using Minkowski distance.

In an example, searches may be prioritized in terms of the relative impact. In another example, the node searches are terminated once a defined fraction of the tree footprint is accounted for. In another example, the trees may be searched hierarchically.

After two trees of relevance with additional nodes of relevance have been identified, opportunities to replace offending nodes in the given tree are sought. At block 360, candidate trees are identified, wherein the sub-trees and/or nodes can be used to replace nodes in the system tree and thereby achieve the desired result (e.g., a lower environmental impact). An alternative tree may be output at block 370.

For purposes of illustration, a given laptop may be identified as being similar to another laptop stored in the database. Suppose the processors of each laptop are identified as the key offender. Then, if the processor in the existing tree has a lower environmental footprint than the processor in the given tree and both have otherwise similar characteristics, the existing processor may be substituted into the given tree to achieve a new tree with lower environmental footprint. We then move on to the next highest offender (e.g., the memory chip), and repeat the process. The output ultimately is a new tree with lower impact (e.g., a lower environmental footprint).

Before continuing, it should be noted that the examples described above are provided for purposes of illustration, and are not intended to be limiting. Other devices and/or device configurations may be utilized to carry out the operations described herein.

Figure 4:
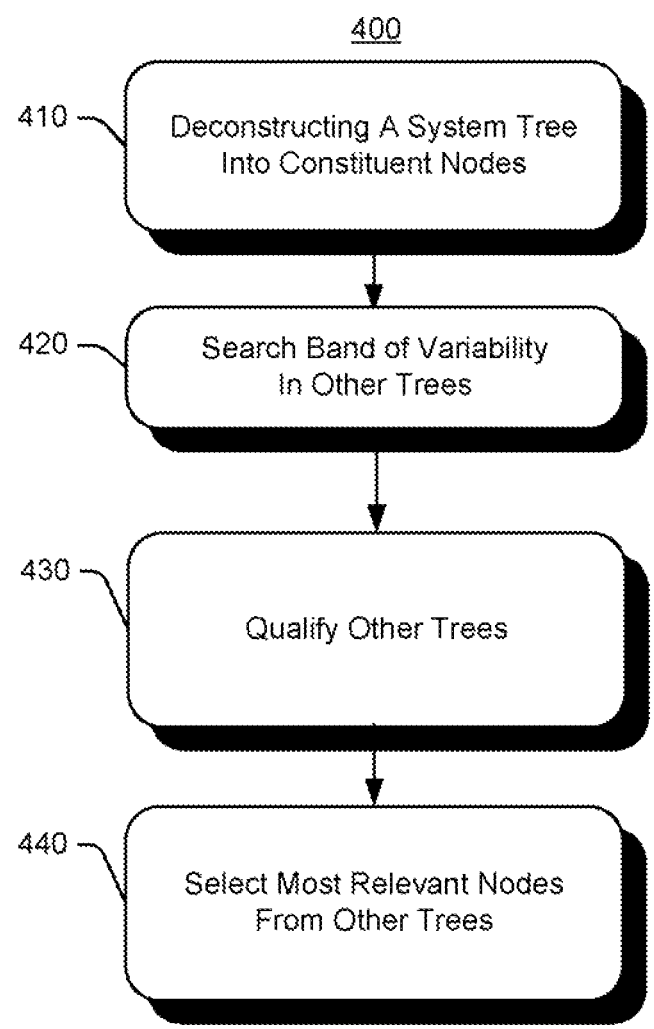
FIG. 4 is a flowchart illustrating example operations of system deconstruction for component substitution.
Figure 5:
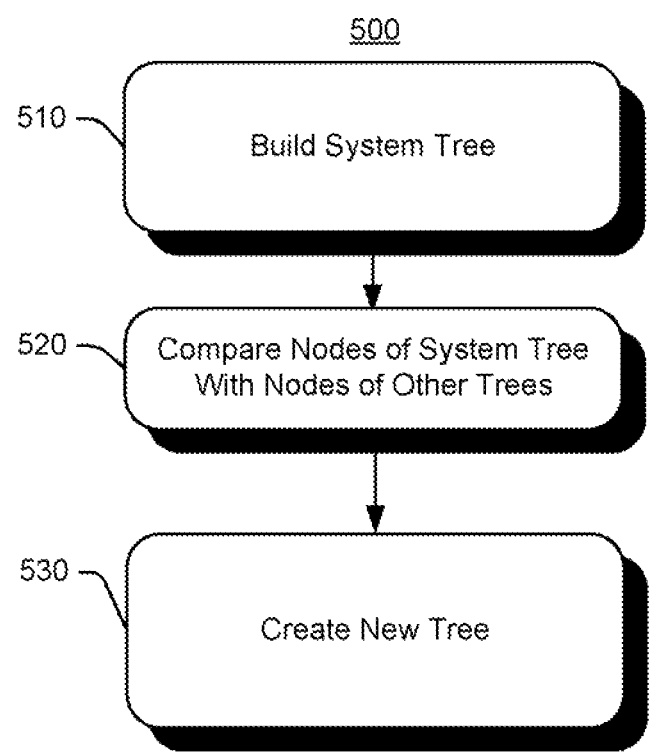
FIG. 5 is a flowchart illustrating example operations of component substitution that may be implemented.

FIGS. 4 and 5 are flowcharts illustrating example operations of which may be implemented. Operations 400 and 500 may be embodied as machine readable instructions on one or more computer-readable medium. When executed on a processor, the instructions cause a general purpose computing device to be programmed as a special-purpose machine that implements the described operations. In an example implementation, the components and connections depicted in the figures may be used.

FIG. 4 is a flowchart illustrating example operations of system deconstruction for component substitution. In operation 410, a system tree is deconstructed in computer-readable medium, the system tree deconstructing into a plurality of constituent nodes, each node in the system tree representing a characteristic of a component of a system under consideration. In operation 420, searching is instantiated within a band of variability in other trees for similar nodes. In operation 430, the other trees are qualified based on a frequency of the similar nodes in the other trees. In operation 440, the most relevant nodes are selected from the other trees by at least one of: prioritizing the similar nodes, terminating nodes, and searching nodes hierarchically.

The operations discussed above are provided to illustrate various examples of component substitution for device manufacture. It is noted that the operations are not limited to the ordering shown. Still other operations may also be implemented.

For purposes of illustration, operations may further include computationally exploring opportunities to reduce cost of at least one node in the system tree. Computationally exploring may include detecting trees with similar structures.

Operations may further include comparing nodes in the other trees and/or comparing trees. Operations may further include sequentially searching the other trees for the band of variability. Operations may further include qualifying the other trees to narrow a results space based on frequency of similar nodes in the other trees, structure of the other trees, and number of branches in the other trees.

Operations may also further include prioritizing node searches based on relative impact of the nodes with respect to one another. Operations may further include terminating node searches after a predetermined portion of an overall impact for the system tree is satisfied. Operations may further include replacing offending nodes.

FIG. 5 is a flowchart illustrating example operations of component substitution which may be implemented. In operation 510, a system tree is constructed having a plurality of nodes, each node in the system tree representing a characteristic of a component of a system under consideration. For example, a tree may be for a new laptop computer. The tree may include a motherboard node, a keyboard node, a hard disk drive node, and a display node. The keyboard node may further include a housing node, a cabling/wireless node, and a circuit board node. In this example, the keyboard node is the parent node and the housing node, cabling/wireless node, and circuit board node are child nodes of the keyboard node. Of course, any degree of granularity may be utilized based at least to some extent on design considerations (including desired output, and time to process).

In operation 520, comparing nodes of the tree with nodes in other trees to identify common nodes (or root or similar node). Continuing with the example from operation 510, the tree for the new laptop computer may be compared with trees for other computers, such as other laptop computers, netbook computers, desktop computers, servers, server blades, etc. The common node may be the keyboard node in each of these other trees. Or the common node may be the circuit board child node for the keyboard node or even the motherboard node.

It is noted that, in this example, the tree for the new laptop computer may also be compared with trees for other, at least somewhat unrelated systems. For example, the processor or memory in a mobile phone may be a suitable substitute for the processor or memory in another system, such as a printer.

In operation 530, generating a new tree for the system under consideration by replacing at least one of the common nodes in the system tree with at least one of the nodes in the other trees. For example, the processor from another laptop computer may be substituted for the processor originally chosen for the new laptop computer to give the new laptop computer a lower environmental impact, lower price, higher customer satisfaction, longer warranty, etc. than the initial design for the new laptop computer may have delivered.

It is noted that various of the operations described herein may be automated or partially automated. For example, building system trees may be fully automatic using retrieval routines executed by program code. Alternatively, at least some user interaction may be provided. In such an example, the user may manually provide production specification(s), and then building system trees may be automatic based at least in part of the user-provided product specification(s). The level of user interaction may be any suitable degree. For example, the user may simply identify that the new system is to be an inkjet printer. Alternatively, the user may identify individual components of the inkjet printer, including but not limited to, the type of ink cartridges, processor speed, memory size, and paper tray options.

In an example, the component substitution operations may be implemented with a customer interface (e.g., web-based product ordering interface). The customer is able to make predetermined selections (e.g., specifying minimum processor speed), and the operations 510-530 described above are implemented on a back-end device to present the user with various designs that meet the customer's minimum expectations. The user can then further select which of the alternatives best suit the customer's preferences (including, e.g., for price, environmental impact, customer satisfaction, and warranty).

Further operations may also include rating the nodes, wherein replacing the at least one of the nodes in the system tree is based on the rating of the nodes. For example, a processor having a higher energy efficiency rating may receive a higher ranking for environmental impact. A processor that is priced lower may receive a higher ranking for price. A processor that has a higher customer satisfaction may receive a higher ranking for customer satisfaction. And so forth. The rankings may further be weighted. For example, if the user values a lower environmental impact above price, then the rating for environmental impact is assigned a higher weight than price.

Still further operations may also include populating a database with characteristics of a plurality of components. The characteristics of the components may include price, environmental impact of the components, customer satisfaction, warranty, and other characteristics dependent at least to some extent on design considerations. Some design considerations may include which characteristics are desired by the user, required by regulation, set forth in company policy, and used to meet manufacturing goals, to name only a few examples.

Still further operations may also include identifying structural relationships between the plurality of nodes in the system tree and the nodes in the other trees. For example, structural relationships may include, but are not limited to, parent-child nodes, and parent-grandchildren nodes.

Still further operations may also include determining at least one substitute component for the system under consideration based on the new tree. In an example, further operations may include outputting a bill of materials with the at least one substitute component based on the new tree. The bill of materials may be printed for a user (e.g., a consumer). In an example, the bill of materials may be vetted (e.g., by a design engineer) to ensure that any substitutions are appropriate. For example, a high-efficiency processor for a laptop computer may not be an appropriate substitution for a mobile phone.

It is noted that the examples shown and described are provided for purposes of illustration and are not intended to be limiting. Still other embodiments are also contemplated.

The invention claimed is:

1. A method, the method carried out by program code stored on non-transient computer-readable medium and executed by a processor, the method comprising:
   deconstructing a first system tree in a computer-readable medium, the first system tree deconstructing into a first plurality of constituent nodes, each node in the first system tree representing a characteristic of a component of a system under consideration;
   searching a database of trees for a plurality of trees containing similar attributes to the first system tree, within an inputted band of variability, across key system characteristics;
   ranking each of the first nodes according to their respective environmental impact in relation to a plurality of relevant nodes such that a second plurality of environmentally unfriendly nodes are ranked highly;

qualifying a second tree of the plurality of trees based on a frequency of nodes in the second tree that are similar to the second environmentally unfriendly nodes;

selecting a third plurality of most relevant nodes from the second tree, wherein the searching the database is terminated when the third nodes reach a threshold, the threshold representing a fraction, less than a whole, of an environmental footprint of the first system tree; and replacing, in the first system tree, the second nodes with the third nodes.

2. The method of claim 1, wherein replacing the second nodes with the third nodes reduces the environmental footprint of the system tree.

3. The method of claim 1, wherein each node representing a characteristic of a component of the system under consideration can be disaggregated into a plurality of nodes.

4. The method of claim 1, wherein the first nodes are arranged in the first system tree based on parent-child relationships between each of the first nodes.

5. The method of claim 1, wherein searching the database of trees comprises detecting trees with a similar structure to the first system tree.

6. The method of claim 1, wherein searching the database of trees comprises sequentially searching the database of trees for trees containing attributes within the band of variability.

7. The method of claim 1, wherein qualifying the second tree narrows the plurality of trees resulting from the searching the database based on frequency of similar nodes in the plurality of trees, structure of the plurality of trees, and number of branches in the plurality of trees.

8. The method of claim 1, further comprising prioritizing node searches based on relative impact of the first nodes with respect to one another.

9. The method of claim 1, further comprising terminating the searching the database after a predetermined portion of an overall impact for the first system tree is satisfied.

10. The method of claim 1, further comprising labeling the second nodes as offending nodes.

11. A system comprising:

a non-transitory computer readable storage to store a first system tree having a first plurality of nodes, each of the first nodes in the first system tree representing a characteristic of a component of a system under consideration; and an analysis engine operatively associated with the non-transitory computer readable storage to deconstruct the first system tree into the first plurality of nodes, the analysis engine searching a database of trees for a plurality of trees containing similar attributes to the first system tree, within an inputted band of variability, across key system characteristics, the analysis engine ranking each of the first nodes according to their respective environmental impact in relation to a plurality of relevant nodes such that a second plurality of environmentally unfriendly nodes are ranked highly, the analysis engine qualifying a second tree of the plurality of trees based on a frequency of nodes in the second tree that are similar to the second environmentally unfriendly nodes, the analysis engine selecting a third plurality of most relevant nodes from the second tree, wherein the analysis engine terminates the searching the database when the third nodes reach a fraction, less than a whole, of an environmental footprint of the first system tree, and the analysis engine replacing, in the first system tree, the second nodes with the third nodes.

12. The system of claim 11, further comprising a substitution and design module called by the analysis engine, the module selecting most relevant nodes from the other trees by at least one of: prioritizing the third nodes, terminating nodes, and searching nodes hierarchically.

13. The system of claim 12, wherein the substitution and design module compares nodes in the second tree.

14. The system of claim 12, wherein the substitution and design module compares trees.

15. The system of claim 11, wherein the analysis engine sequentially searches the database of trees for trees containing attributes within the band of variability.

16. The system of claim 11, wherein the analysis engine qualifies the second tree by narrowing the plurality of trees resulting from searching the database based on frequency of similar nodes in the plurality of trees, structure of the plurality of trees, and number of branches in the plurality of trees.

17. The system of claim 11, wherein the analysis engine prioritizes node searches based on relative impact of the first nodes with respect to one another.

18. The system of claim 11, wherein the analysis engine terminates the searching the database after a predetermined portion of an overall impact for the first system tree is satisfied.

19. A system, comprising:

a processor;

a non-transitory storage medium to store instructions executed by the processor to implement an analysis engine operatively associated with computer readable storage to deconstruct a first system tree into a first plurality of constituent nodes, each of the first plurality of nodes in the first system tree representing a characteristic of a component of a system under consideration, the analysis engine searching a database of trees for a plurality of trees containing similar attributes to the first system tree, within an inputted band of variability, across key system characteristics, the analysis engine ranking each of the first nodes according to their respective environmental impact in relation to a plurality of relevant nodes such that a second plurality of environmentally unfriendly nodes are ranked highly, and the analysis engine qualifying a second tree based on a frequency of nodes in the second tree that are similar to the second environmentally unfriendly nodes; and the non-transitory storage medium to further store instructions executed by the processor to implement a substitution and design module called by the analysis engine, the module selecting a third plurality of most relevant nodes from the second tree, wherein the searching the database is terminated when the third nodes reach a threshold, the threshold representing a fraction, less than a whole, of an environmental footprint of the system tree, the module further to replace in the first system tree, the second nodes with the third nodes.

20. The system of claim 19, wherein the analysis engine prioritizes node searches based on relative impact of the first nodes with respect to one another, and the analysis engine terminates the searching the database after a predetermined portion of an overall impact for the first system tree is satisfied.

* * * * *